United States Patent
Wilson (10) Patent No.: US 6,563,453 B1
(45) Date of Patent: May 13, 2003

(54) USAGE OF SECOND MODE S ADDRESS FOR TCAS BROADCAST INTERROGATION MESSAGES

(75) Inventor: Kevin Wilson, Shawnee, KS (US)

(73) Assignee: Honeywell International Inc., Morristown, NJ (US)

( * ) Notice: Subject to any disclaimer, the term of this patent is extended or adjusted under 35 U.S.C. 154(b) by 311 days.

(21) Appl. No.: 09/626,834

(22) Filed: Jul. 27, 2000

Related U.S. Application Data (60) Provisional application No. 60/146,237, filed on Jul. 28, 1999.

(51) Int. Cl.<sup>7</sup> ............................................. G01S 13/93
(52) U.S. Cl. ........................... 342/29; 342/30; 342/32; 342/46; 701/301
(58) Field of Search ............................ 342/29, 30, 32, 342/36, 37, 42, 46; 340/945, 961; 701/301

(56) References Cited

U.S. PATENT DOCUMENTS

| | | | | |
|---|---|---|---|---|
| 4,782,450 A | * | 11/1988 | Flax | ............................ 701/301 |
| 2002/0063653 A1 | * | 5/2002 | Oey et al. | ...................... 342/29 |
| 2002/0133294 A1 | * | 9/2002 | Farmakis et al. | ........... 701/301 |

* cited by examiner

*Primary Examiner*—John B. Sotomayor
(74) *Attorney, Agent, or Firm*—Honeywell International Inc.

(57) ABSTRACT

A method of a Traffic Alert and Collision Avoidance System (TCAS), includes the step of utilizing an MID Subfield for a TCAS Broadcast Interrogation Message that is different than a Mode S address assigned to the own aircraft, the aircraft on which a TCAS is installed. A Traffic Alert and Collision Avoidance System includes a TCAS processing unit that performs a method including the step of utilizing an MID Subfield for a TCAS Broadcast Interrogation Message that is different than a Mode S address assigned to the own aircraft.

26 Claims, 3 Drawing Sheets

USAGE OF SECOND MODE S ADDRESS FOR TCAS BROADCAST INTERROGATION MESSAGES

CROSS-REFERENCE TO RELATED APPLICATION

This application claims the benefit of provisional application No. 60/146,237, filed Jul. 28, 1999.

BACKGROUND OF THE INVENTION

1. Field of the Invention

The present invention relates to a Traffic Alert and Collision Avoidance System (TCAS) used in aircraft, and more particularly to an improved system and method for the TCAS units of locally clustered TCAS-equipped aircraft to transmit a signal, specifically a TCAS Broadcast Interrogation Message (Uplink Format 16, or UF-16). This message provides identification information to other aircraft with collision avoidance systems in the area.

2. Description of the Related Art

A Traffic Alert and Collision Avoidance System provides a flight crew with information necessary for safe flight. More specifically, a TCAS provides the flight crew with information on the location of other aircraft in the vicinity, thereby actively preventing a collision by alerting the flight crew to the threat of a collision with another aircraft in time for evasive action.

In operation, a TCAS interrogates the transponders of other aircraft, sometimes referred to as "intruder" aircraft, and the transponders reply with information about the location of the intruder aircraft. (The aircraft on which the TCAS is installed is referred to as the "own" aircraft.) The TCAS then evaluates the threat of collision with the intruder aircraft and may provide a suggested vertical maneuver for the own aircraft.

TCAS systems operate in conjunction with Mode A, Mode C, and Mode S type transponders. When a TCAS-equipped aircraft, i.e., the own aircraft, approaches an intruder aircraft, the own aircraft determines the location of the intruder aircraft by interrogating the intruder's transponder every second. If the intruder aircraft is equipped with a Mode A transponder, the transponder receives an interrogation signal and responds with a reply signal which allows the own aircraft to calculate the range and bearing of the intruder aircraft based on the reply time and direction of the signal. If the intruder aircraft has a Mode C transponder, the reply also includes altitude information.

On the other hand, if the intruder aircraft is equipped with a Mode S transponder, the method of interrogation by the own aircraft is slightly different. Mode S transponders differ from Mode A and C transponders in that a Mode S transponder transmits a spontaneous transmission (known as a squitter) once every second, even when no interrogation signal is received, i.e., the Mode S transponder transmits an unsolicited reply. Furthermore, the Mode S unsolicited reply contains the Mode S "address" (assigned by aviation authorities) of the transmitting aircraft. Once a squitter is received, the TCAS-equipped aircraft sends a direct interrogation to the intruder aircraft, based on the known address of the intruder aircraft. The interrogation is transmitted in Uplink Format 0 (UF-0). The message is received by the transponder of the intruder aircraft, which transmits a reply signal in Downlink Format 0 (DF-0). The DF-0 reply contains information about the intruder aircraft. For example, the DF-0 reply contains information about the capability of TCAS on the intruder aircraft. The Mode S transponder of the intruder aircraft then responds with its reply signal, which includes altitude information.

Regardless of the type of transponder contained in the interrogated target aircraft, the TCAS equipped aircraft uses the received signal to determine whether the flight path of the target aircraft is a potential threat. Depending upon the complexity of the TCAS equipment, the system either generates a warning signal to the pilot indicating the existence of a potential collision, or generates a warning signal and a conflict resolution advisory, which advises the pilot of vertical maneuvers necessary to avoid a collision.

A conventional TCAS currently transmits a TCAS Broadcast Interrogation Message with a Mode S Address (MID) Subfield set to the Mode S address assigned to the own aircraft, and these Broadcast Interrogation Messages are received by other TCAS-equipped aircraft in the area. Thus, the Mode S address contained in the MID Subfield of the TCAS Broadcast Interrogation Message is the same Mode S address used in the reply is message of a Mode S transponder. Furthermore, TCAS-equipped aircraft that transmit a TCAS Broadcast Interrogation Message and have onboard Mode S transponders are tracked by other TCAS-equipped aircraft through Mode S surveillance.

A TCAS also keeps track of other TCAS-equipped aircraft in the area (nominally 30 nautical miles) and maintains a count of the unique TCAS Broadcast Interrogation Messages received within the past 20 seconds. Using this information, it determines the number of TCAS-equipped aircraft (NTA) in the area. In a process known as Interference Limiting, the TCAS reduces the Radio Frequency (RF) emissions when necessary due to the number of TCAS-equipped aircraft in the area.

Change 7 to TCAS, required by several foreign countries, has been implemented as TCAS II, Version 7 (known as Airborne Collision Avoidance System, or ACAS II, internationally). ACAS II includes the additional concepts of NTA3 and NTA6 for the purpose of Interference Limiting. NTA3 and NTA6 refer to the number of TCAS-equipped aircraft within three and six nautical miles of own aircraft, respectively, and ACAS II reduces the RF emissions when necessary due to the number of TCAS-equipped aircraft within three and six nautical miles.

To determine NTA3 and NTA6, ACAS II associates the MID Subfields of received TCAS Broadcast Interrogation Messages with the addresses of aircraft that the ACAS II currently has under Mode S surveillance. In other words, ACAS II uses Mode S addresses to determine the range to TCAS-equipped aircraft in the area.

However, a problem occurs with ACAS II when TCAS-equipped aircraft (transmitting TCAS Broadcast Interrogation Messages) are locally "clustered" in a manner not anticipated during the development of ACAS II. Such unanticipated local clusters of TCAS-equipped aircraft include helicopters flying in close proximity to one another, such as helicopters covering news and sporting events, and military formations consisting of aircraft equipped with TCAS. These local clusters of TCAS-equipped aircraft may cause the ACAS II Interference Limiting algorithms to unnecessarily reduce RF transmissions, and thus the surveillance range, of nearby ACAS II-equipped aircraft. Clusters involving as few as 3 TCAS-equipped aircraft can significantly reduce the surveillance range of proximate ACAS II-equipped aircraft flying below 18,000 feet MSL (mean sea level). For example, these three-aircraft clusters can cause a six dB reduction in power in ACAS II units within three nautical miles and below 18,000 feet MSL (effectively halving the surveillance range).

Several solutions to this problem have been proposed and subsequently rejected as not technically or politically feasible. For example, one solution is to suppress TCAS/ACAS broadcasts when the TCAS units are clustered together. However, this solution is undesirable because ACAS II-equipped aircraft will not have an accurate count of all TCAS-equipped aircraft in the area, i.e., NTA will be too low. Another solution is to modify ACAS II to accommodate the clustered TCAS units. However, modifications to ACAS II will not be approved by the International Civil Aviation Organization (ICAO) or the Federal Aviation Administration (FAA).

SUMMARY OF THE INVENTION

It is a general object of the present invention to provide a system and method for TCAS Broadcast Interrogation Messages (UF-16) that overcome the disadvantages of the conventional systems.

It is another object of the present invention to provide a system and method for locally clustered TCAS-equipped aircraft to transmit TCAS Broadcast Interrogation Messages that do not cause the Interference Limiting algorithms of ACAS II units to unnecessarily restrict their RF emissions and surveillance range.

In accordance with the objects described above, one aspect of the present invention includes a method of a Traffic Alert and Collision Avoidance System that includes the step of utilizing an MID Subfield for a TCAS Broadcast Interrogation Message that is different than a Mode S address assigned to the own aircraft, the aircraft on which a TCAS is installed. This aspect may be further characterized in that the different MID Subfield may be randomly generated or may be generated by adding an offset to the own aircraft Mode S address.

In another aspect of the present invention, the method discussed above may further include the step of determining whether another TCAS-equipped aircraft is near the own aircraft, where the utilizing step is performed only if the determining step determines that another TCAS-equipped aircraft is near the own aircraft. Additionally, the method discussed above may further include the step of determining whether at least two other TCAS-equipped aircraft are within three nautical miles of the own aircraft, where the utilizing step is performed only if the determining step determines that at least two other TCAS-equipped aircraft are within three nautical miles of the own aircraft. This aspect of the present invention may be further characterized by including the steps of continuing, after the utilizing step begins to utilize the different MID Subfield for the TCAS Broadcast Interrogation Message, to determine whether at least two other TCAS-equipped aircraft are within three nautical miles of the own aircraft, and reverting to the own aircraft Mode S address for the MID Subfield of the TCAS Broadcast Interrogation Message when the continuing step determines that at least two other TCAS-equipped aircraft are not within three nautical miles of the own aircraft.

In still another aspect of the present invention, a method of a Traffic Alert and Collision Avoidance System includes the steps of utilizing an MID Subfield for a TCAS Broadcast Interrogation Message that is different than a Mode S address assigned to the own aircraft, the aircraft on which a TCAS is installed, and comparing the different MID Subfield of the TCAS Broadcast Interrogation Message to Mode S addresses known to the own aircraft. In this aspect, if the different MID Subfield is not unique among the known Mode S addresses, then a new address is generated and utilized in the utilizing step, and the new address is different from the Mode S address of the own aircraft. In another aspect of the present invention, a method of a Traffic Alert and Collision Avoidance System includes the steps of utilizing an MID Subfield for a TCAS Broadcast Interrogation Message that is different than a Mode S address assigned to the own aircraft, the aircraft on which a TCAS is installed; determining whether at least two other TCAS-equipped aircraft are within three nautical miles of the own aircraft, where the utilizing step is performed only if the determining step determines that at least two other TCAS-equipped aircraft are within three nautical miles of the own aircraft; comparing the different MID Subfield of the TCAS Broadcast Interrogation Message to Mode S addresses known to the own aircraft; generating, if the different MID Subfield is not unique among the known Mode S addresses, a new address for use in the utilizing step, the new address being different from the Mode S address of the own aircraft; continuing, after the utilizing step begins to utilize the different MID Subfield for the TCAS Broadcast Interrogation Message, to determine whether at least two other TCAS-equipped aircraft are within three nautical miles of the own aircraft; and reverting to the own aircraft Mode S address for the MID Subfield of the TCAS Broadcast Interrogation Message when the continuing step determines that at least two other TCAS-equipped aircraft are not within three nautical miles of the own aircraft.

According to yet another aspect of the present invention, a Traffic Alert and Collision Avoidance System includes a TCAS processing unit that performs a method including the step of utilizing an MID Subfield for a TCAS Broadcast Interrogation Message that is different than a Mode S address assigned to the own aircraft, the aircraft on which a TCAS is installed. This aspect may be further characterized in that the different MID Subfield may be randomly generated or may be generated by adding an offset to the own aircraft Mode S address.

According to still another aspect of the present invention, the method performed by the TCAS processing unit discussed above may further include the step of determining whether another TCAS-equipped aircraft is near the own aircraft, and the utilizing step is performed only if the determining step determines that another TCAS-equipped aircraft is near the own aircraft. Additionally, the method performed by the TCAS processing unit discussed above may further include the step of determining whether at least two other TCAS-equipped aircraft are within three nautical miles of the own aircraft, where the utilizing step is performed only if the determining step determines that at least two other TCAS-equipped aircraft are within three nautical miles of the own aircraft. This aspect of the present invention may be further characterized by including the steps of continuing, after the utilizing step begins to utilize the different MID Subfield for the TCAS Broadcast Interrogation Message, to determine whether at least two other TCAS-equipped aircraft are within three nautical miles of the own aircraft, and reverting to the own aircraft Mode S address for the MID Subfield of the TCAS Broadcast Interrogation Message when the continuing step determines that at least two other TCAS-equipped aircraft are not within three nautical miles of the own aircraft.

In still another aspect of the present invention, a Traffic Alert and Collision Avoidance System includes a TCAS processing unit that performs a method including the steps of utilizing an MID Subfield for a TCAS Broadcast Interrogation Message that is different than a Mode S address assigned to the own aircraft, the aircraft on which a TCAS is installed, and comparing the different MID Subfield of the TCAS Broadcast Interrogation Message to Mode S addresses known to the own aircraft. In this aspect, if the different MID Subfield is not unique among the known Mode S addresses, then a new address is generated and utilized in the utilizing step, and the new address is different from the Mode S address of the own aircraft.

In another aspect of the present invention, a Traffic Alert and Collision Avoidance System includes a TCAS processing unit that performs a method including the steps of utilizing an MID Subfield for a TCAS Broadcast Interrogation Message that is different than a Mode S address assigned to the own aircraft, the aircraft on which a TCAS is installed; determining whether at least two other TCAS-equipped aircraft are within three nautical miles of the own aircraft, where the utilizing step is performed only if the determining step determines that at least two other TCAS-equipped aircraft are within three nautical miles of the own aircraft; comparing the different MID Subfield of the TCAS Broadcast Interrogation Message to Mode S addresses known to the own aircraft; generating, if the different MID Subfield is not unique among the known Mode S addresses, a new address for use in the utilizing step, the new address being different from the Mode S address of the own aircraft; continuing, after the utilizing step begins to utilize the different MID Subfield for the TCAS Broadcast Interrogation Message, to determine whether at least two other TCAS-equipped aircraft are within three nautical miles of the own aircraft; and reverting to the own aircraft Mode S address for the MID Subfield of the TCAS Broadcast Interrogation Message when the continuing step determines that at least two other TCAS-equipped aircraft are not within three nautical miles of the own aircraft.

According to another aspect of the present invention, a Traffic Alert and Collision Avoidance System includes digital circuit that performs a method including the step of utilizing an MID Subfield for a TCAS Broadcast Interrogation Message that is different than a Mode S address assigned to the own aircraft, the aircraft on which a TCAS is installed.

In another aspect of the present invention, Computer executable code is provided for implementing a method of a Traffic Alert and Collision Avoidance System, the code for executing the step of utilizing an MID Subfield for a TCAS Broadcast Interrogation Message that is different than a Mode S address assigned to the own aircraft, the aircraft on which a TCAS is installed. This aspect may be further characterized in that the different MID Subfield may be randomly generated or may be generated by adding an offset to the own aircraft Mode S address In another aspect of the present invention, the method implemented by the computer executable code discussed above may further include the step of determining whether another TCAS-equipped aircraft is near the own aircraft, where the utilizing step is performed only if the determining step determines that another TCAS-equipped aircraft is near the own aircraft. Additionally, the method implemented by the computer executable code discussed above may further include the step of determining whether at least two other TCAS-equipped aircraft are within three nautical miles of the own aircraft, where the utilizing step is performed only if the determining step determines that at least two other TCAS-equipped aircraft are within three nautical miles of the own aircraft. This aspect of the present invention may be further characterized by the method including the steps of continuing, after the utilizing step begins to utilize the different MID Subfield for the TCAS Broadcast Interrogation Message, to determine whether at least two other TCAS-equipped aircraft are within three nautical miles of the own aircraft, and reverting to the own aircraft Mode S address for the MID Subfield of the TCAS Broadcast Interrogation Message when the continuing step determines that at least two other TCAS-equipped aircraft are not within three nautical miles of the own aircraft.

In still another aspect of the present invention, Computer executable code is provided for implementing a method of a Traffic Alert and Collision Avoidance System, the code for executing the steps including utilizing an MID Subfield for a TCAS Broadcast Interrogation Message that is different than a Mode S address assigned to the own aircraft, the aircraft on which a TCAS is installed, and comparing the different MID Subfield of the TCAS Broadcast Interrogation Message to Mode S addresses known to the own aircraft. In this aspect, if the different MID Subfield is not unique among the known Mode S addresses, then a new address is generated and utilized in the utilizing step, and the new address is different from the Mode S address of the own aircraft.

In another aspect of the present invention, Computer executable code is provided for implementing a method of a Traffic Alert and Collision Avoidance System, the code for executing the steps including utilizing an MID Subfield for a TCAS Broadcast Interrogation Message that is different than a Mode S address assigned to the own aircraft, the aircraft on which a TCAS is installed; determining whether at least two other TCAS-equipped aircraft are within three nautical miles of the own aircraft, where the utilizing step is performed only if the determining step determines that at least two other TCAS-equipped aircraft are within three nautical miles of the own aircraft; comparing the different MID Subfield of the TCAS Broadcast Interrogation Message to Mode S addresses known to the own aircraft; generating, if the different MID Subfield is not unique among the known Mode S addresses, a new address for use in the utilizing step, the new address being different from the Mode S address of the own aircraft; continuing, after the utilizing step begins to utilize the different MID Subfield for the TCAS Broadcast Interrogation Message, to determine whether at least two other TCAS-equipped aircraft are within three nautical miles of the own aircraft; and reverting to the own aircraft Mode S address for the MID Subfield of the TCAS Broadcast Interrogation Message when the continuing step determines that at least two other TCAS-equipped aircraft are not within three nautical miles of the own aircraft.

These and other aspects, objects, and features of the present invention will become apparent from the following detailed description of the preferred embodiments, read in conjunction with, and reference to, the accompanying drawings.

DETAILED DESCRIPTION OF THE PREFERRED EMBODIMENTS

When locally clustered, aircraft equipped with a TCAS according to the present invention avoid the problems of the conventional methods by transmitting TCAS Broadcast Interrogation Messages with an MID Subfield that differs from the Mode S address assigned to own aircraft. The MID Subfield should be unique in the local area in which the TCAS-equipped aircraft is operating.

ACAS II-equipped aircraft must have an aircraft under Mode S surveillance to determine ranges for received TCAS Broadcast Interrogation Messages, i.e., the Interference Limiting algorithms for NTA3 and NTA6 use Mode S addresses to determine the number of aircraft within three and six nautical miles, respectively. Thus, NTA3 and NTA6 will not be affected by locally clustered TCAS-equipped aircraft using TCAS Broadcast Interrogation Messages with an address different from the Mode S address of own aircraft and unique among all other nearby Mode S aircraft. Consequently, the ACAS II recognizes the presence of the locally clustered TCAS-equipped aircraft, but the system cannot calculate these aircraft as being within NTA3 or NTA6. Therefore, the ACAS II does not unnecessarily restrict RF output and surveillance range due to the locally clustered TCAS-equipped aircraft.

The present invention provides a mechanism by which aircraft may be afforded the protection of an ACAS-like product without adversely affecting the surrounding airspace. Furthermore, utilizing the unique MID Subfield in the TCAS Broadcast Interrogation Message prevents ACAS II-equipped aircraft from detecting the unanticipated local cluster so that its surveillance range is not adversely impacted, yet ACAS II-equipped aircraft are still able to accurately determine the NTA for the purpose of Interference Limiting.

Figure 1:
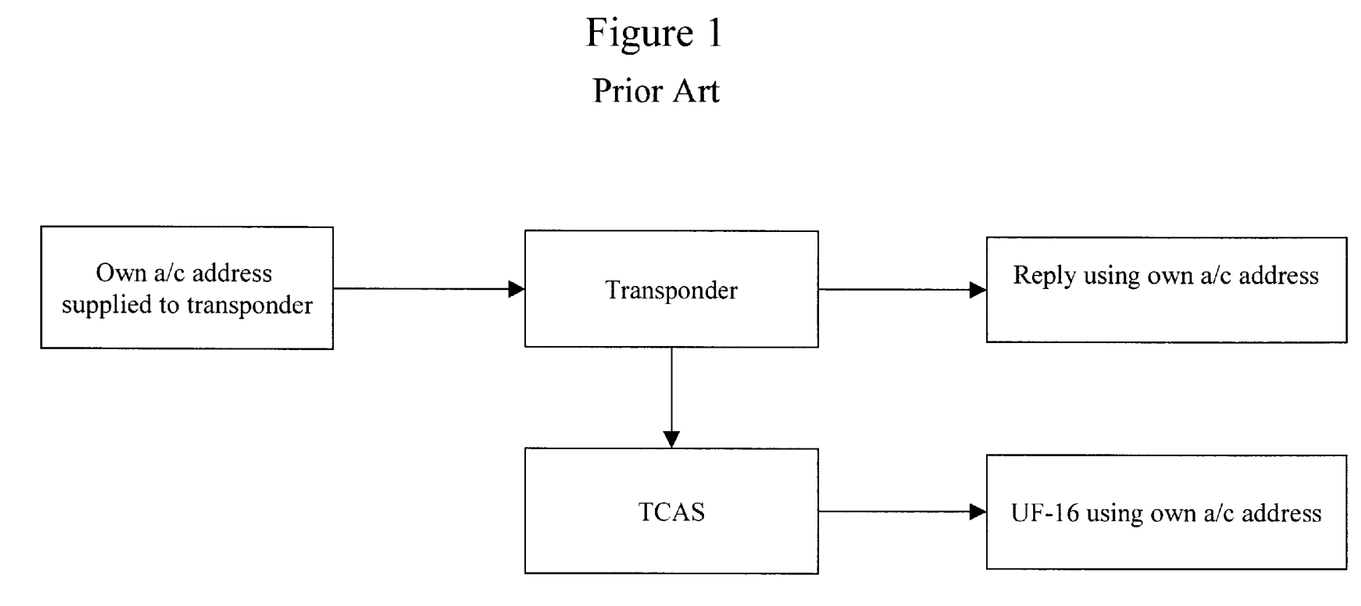
FIG. 1 is a block diagram showing the conventional address scheme for TCAS Broadcast Interrogation Messages.

FIG. 1 is a block diagram showing the conventional address scheme for TCAS Broadcast Interrogation Messages. The own aircraft Mode S address is supplied to the transponder, and the transponder uses that Mode S address when replying to interrogations. The transponder also supplies that Mode S address to the TCAS, and the TCAS uses that Mode S address in its TCAS Broadcast Interrogation Message.

Figure 2:
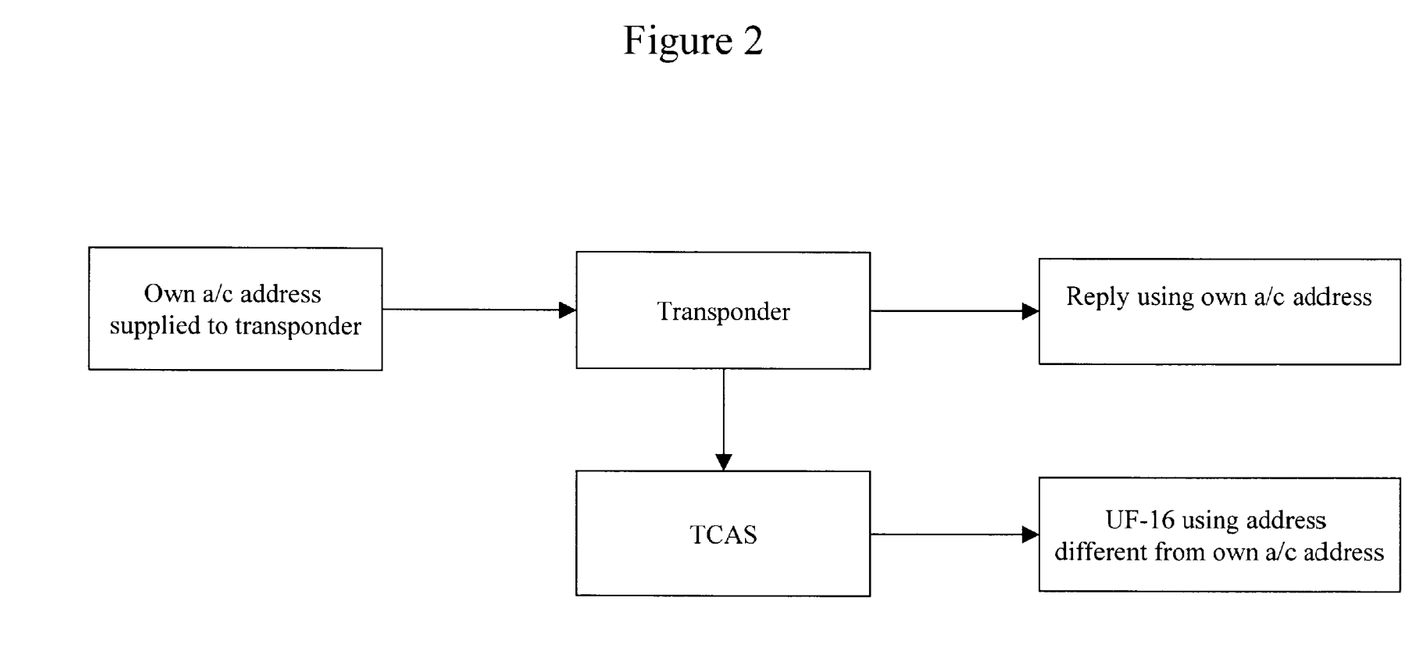
FIG. 2 is a block diagram showing the address scheme for TCAS Broadcast Interrogation Messages according to the present invention.

FIG. 2 is a block diagram showing the address scheme for TCAS Broadcast Interrogation Messages according to the present invention. The own aircraft Mode S address is supplied to the transponder, and the transponder uses that Mode S address when replying to interrogations. The transponder also supplies that Mode S address to the TCAS; however, the TCAS uses an address different from that Mode S address in its TCAS Broadcast Interrogation Message when the TCAS-equipped aircraft are locally clustered.

The present invention applies to non-ACAS II type units, which includes ACAS and TCAS units that do not meet the provisions of the ICAO International Standards and Recommended Practices (SARPs). The present invention also applies to ACAS II units installed in aircraft that fly in a local cluster, for example, military aircraft that fly in formation. The units that do not meet the ICAO SARPs' provisions have been previously referred to as Special TCAS installations (hereinafter STCAS). STCAS also includes ACAS I units based on ACAS II but without Resolution Advisory and could include locally clustered ACAS II units.

Figure 3:
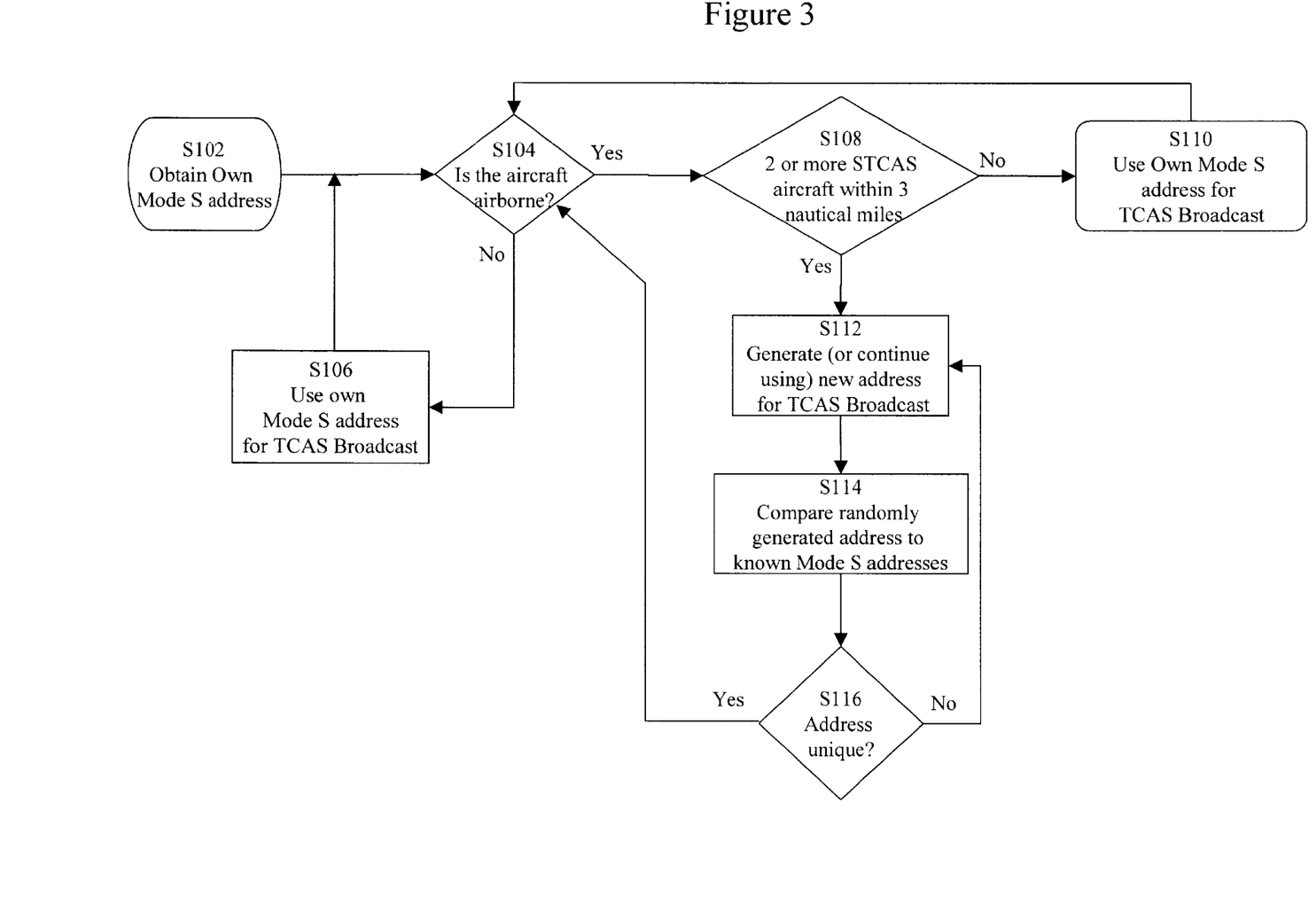
FIG. 3 is a flowchart showing the address scheme for TCAS Broadcast Interrogation Messages according to the present invention.

One embodiment of the present invention includes incorporating into STCAS units the algorithm of FIG. 3 to determine the address to be used in its TCAS Broadcast Interrogation Message. In Step S 102, the STCAS obtains the own aircraft Mode S address on power-up for use in its TCAS Broadcast Interrogation Message. In Step S104, it is determined if the aircraft is airborne. The own aircraft Mode S address is used for the TCAS Broadcast Interrogation Message when the aircraft is on the ground, Step S106. (If the STCAS does not have the means to form an on-ground determination, then it will be considered airborne.) The process then repeats Step S104 until the aircraft is airborne.

Once the aircraft is airborne, the process proceeds to Step S108 where the STCAS determines if at least two other airborne STCAS-equipped aircraft (i.e., reporting onboard ACAS with no vertical resolution capability) are within three nautical miles of own aircraft. This determination is possible because STCAS units will be indicating (via DF-0 replies) that they are a TCAS without vertical resolution capability. (If the STCAS does not have the means to form an on-ground determination for other aircraft, then it will consider all intruding aircraft to be airborne.) If the result of Step S108 is negative, then the STCAS continues to use the own aircraft Mode S address for the TCAS Broadcast Interrogation Message, Step S110. The process then returns to Step S104. If the result of Step S108 is positive, then the STCAS generates a new address for use in its TCAS Broadcast Interrogation Message, Step S112.

In Step S114, the STCAS compares its randomly generated TCAS Broadcast Interrogation Message address to known Mode S addresses at a one Hertz rate, and in Step S116, it is determined if the TCAS Broadcast Interrogation Message address is unique compared to other addresses currently in use within the operating range of the TCAS (nominally 30 nautical miles). If the address is not unique (for example, if another aircraft with that address enters the airspace), then the process returns to Step S112 where a new address is generated. If the address is unique, then the process returns to Step S104. The loop of Steps S104, S108, S112, S114, S116, and S104 is repeated until it is determined in Step S108 that less than two STCAS-equipped aircraft are within three nautical miles. In that case, the process proceeds from Step S108 to Step S110, and the unit reverts to using the own aircraft Mode S address as the TCAS Broadcast Interrogation Message. Thus, once the local cluster disperses, the STCAS reverts to the own aircraft address, allowing ACAS II units to receive an accurate picture of the airspace. Furthermore, the STCAS also reverts to the own aircraft address when it is determined in Step S104 that the aircraft is on the ground. Note that, in this embodiment, while the loop of Steps S104, S108, S112, S114, S116, and S104 is repeated, the STCAS continues to use the previously generated address in Step S112, rather than generating a new address each time Step S112 is repeated.

In this embodiment of the present invention, the new TCAS Broadcast Interrogation Message address is randomly generated and is unique among all Mode S addresses known to the STCAS (via received squitters, received ACAS Broadcast Messages, or Established Mode S Tracks). The randomly generated TCAS Broadcast Message address is uniformly distributed and seeded with the own aircraft Mode S address.

When the STCAS uses a unique randomly generated address, then the ACAS II-equipped aircraft may see an increase in NTA for up to 20 seconds. This increase would occur during the time when the ACAS II unit times-out the "old" TCAS Broadcast Interrogation Message address and adds the new one.

It is important to verify the intruding STCAS is reporting onboard ACAS with no vertical resolution capability so an STCAS flying near ACAS II units will allow the ACAS II Interference Limiting algorithms to work as intended. Only when locally clustered with other STCAS aircraft should an STCAS attempt to prevent ACAS II from "seeing" the cluster.

The present invention is not limited to only a randomly generated address used in place of the Mode S address. Rather, the present invention encompasses the use of any address that is different from the Mode S address. For example, the different address could also be obtained (i.e., generated in Step S112 of FIG. 3) by adding an offset to the current Mode S address.

The present invention is also not limited to the use of a different MID Subfield when three STCAS-equipped aircraft are locally clustered within three nautical miles of each other. The present invention applies to any Collision Avoidance System that uses an MID Subfield address different from the Mode S address of own aircraft. The present invention also applies to clusters of two or more aircraft operating near each other, i.e., within a range of 0 to 30 nautical miles, preferably less than six nautical miles, and more preferably less than 3 nautical miles. The exact range is chosen based on the clustering effect realized by the ACAS II systems.

It is preferable to use the present invention with computer hardware/software that performs the method of the present invention. As will be appreciated by those skilled in the art, the systems, methods, and procedures described herein can be embodied in a programmable computer, computer executable software, or digital or analog circuitry. The software can be stored on computer readable media, for example, on a floppy disk, RAM, ROM, a hard disk, removable media, flash memory, memory sticks, optical media, magneto-optical media, CD-ROMs, etc. The digital circuitry can include integrated circuits, gate arrays, building block logic, field programmable gate arrays (FPGA), etc.

It is more preferable for the present invention to be implemented by the TCAS processing unit of a Traffic Alert and Collision Avoidance System. The TCAS processing unit executes software for performing the method of the present invention and interacts with other aircraft systems.

Although specific embodiments of the present invention have been described above in detail, it will be understood that this description is merely for purposes of illustration. Various modifications of, and equivalent steps corresponding to, the disclosed aspects of the preferred embodiments, in addition to those described above, may be made by those skilled in the art without departing from the spirit of the present invention defined in the following claims, the scope of which is to be accorded the broadest interpretation so as to encompass such modifications and equivalent structures.

I claim:

1. A method of a Traffic Alert and Collision Avoidance System (TCAS), comprising the step of:
   utilizing an MID Subfield for a TCAS Broadcast Interrogation Message that is different than a Mode S address assigned to own aircraft, the aircraft on which a TCAS is installed.

2. A method according to claim 1, further comprising the step of:
   determining whether another TCAS-equipped aircraft is near the own aircraft,
   wherein said utilizing step is performed only if said determining step determines that another TCAS-equipped aircraft is near the own aircraft.

3. A method according to claim 1, further comprising the step of:
   determining whether at least two other TCAS-equipped aircraft are within three nautical miles of the own aircraft,
   wherein said utilizing step is performed only if said determining step determines that at least two other TCAS-equipped aircraft are within three nautical miles of the own aircraft.

4. A method according to claim 3, further comprising the steps of:
   continuing, after said utilizing step begins to utilize the different MID Subfield for the TCAS Broadcast Interrogation Message, to determine whether at least two other TCAS-equipped aircraft are within three nautical miles of the own aircraft; and
   reverting to the own aircraft Mode S address for the MID Subfield of the TCAS Broadcast Interrogation Message when said continuing step determines that at least two other TCAS-equipped aircraft are not within three nautical miles of the own aircraft.

5. A method according to claim 1, further comprising the step of:
   comparing the different MID Subfield of the TCAS Broadcast Interrogation Message to Mode S addresses known to the own aircraft,
   wherein if the different MID Subfield is not unique among the known Mode S addresses, then a new address is generated and utilized in said utilizing step, the new address being different from the Mode S address of the own aircraft.

6. A method according to claim 1, further comprising the steps of:
   determining whether at least two other TCAS-equipped aircraft are within three nautical miles of the own aircraft, said utilizing step being performed only if said determining step determines that at least two other TCAS-equipped aircraft are within three nautical miles of the own aircraft;
   comparing the different MID Subfield of the TCAS Broadcast Interrogation Message to Mode S addresses known to the own aircraft;
   generating, if the different MID Subfield is not unique among the known Mode S addresses, a new address for use in said utilizing step, the new address being different from the Mode S address of the own aircraft;
   continuing, after said utilizing step begins to utilize the different MID Subfield for the TCAS Broadcast Interrogation Message, to determine whether at least two other TCAS-equipped aircraft are within three nautical miles of the own aircraft; and
   reverting to the own aircraft Mode S address for the MID Subfield of the TCAS Broadcast Interrogation Message when said continuing step determines that at least two other TCAS-equipped aircraft are not within three nautical miles of the own aircraft.

7. A method according to claim 1, wherein the different MID Subfield is randomly generated.

8. A method according to claim 1, wherein the different MID Subfield is generated by adding an offset to the own aircraft Mode S address.

9. A Traffic Alert and Collision Avoidance System (TCAS), comprising:
   a TCAS processing unit that performs a method comprising the step of utilizing an MID Subfield for a TCAS Broadcast Interrogation Message that is different than a Mode S address assigned to own aircraft, the aircraft on which a TCAS is installed.

10. A Traffic Alert and Collision Avoidance System according to claim 9, said method further comprising the step of determining whether another TCAS-equipped aircraft is near the own aircraft, wherein said utilizing step is performed only if said determining step determines that another TCAS-equipped aircraft is near the own aircraft.

11. A Traffic Alert and Collision Avoidance System according to claim 9, said method further comprising the step of determining whether at least two other TCAS-equipped aircraft are within three nautical miles of the own aircraft, wherein said utilizing step is performed only if said determining step determines that at least two other TCAS-equipped aircraft are within three nautical miles of the own aircraft.

12. A Traffic Alert and Collision Avoidance System according to claim 11, said method further comprising the steps of continuing, after said utilizing step begins to utilize the different MID Subfield for the TCAS Broadcast Interrogation Message, to determine whether at least two other TCAS-equipped aircraft are within three nautical miles of the own aircraft; and reverting to the own aircraft Mode S address for the MID Subfield of the TCAS Broadcast Interrogation Message when said continuing step determines that at least two other TCAS-equipped aircraft are not within three nautical miles of the own aircraft.

13. A Traffic Alert and Collision Avoidance System according to claim 9, said method further comprising the step of comparing the different MID Subfield of the TCAS Broadcast Interrogation Message to Mode S addresses known to the own aircraft, wherein if the different MID Subfield is not unique among the known Mode S addresses, then a new address is generated and utilized in said utilizing step, the new address being different from the Mode S address of the own aircraft.

14. A Traffic Alert and Collision Avoidance System according to claim 9, said method further comprising the steps of determining whether at least two other TCAS-equipped aircraft are within three nautical miles of the own aircraft, said utilizing step being performed only if said determining step determines that at least two other TCAS-equipped aircraft are within three nautical miles of the own aircraft; comparing the different MID Subfield of the TCAS Broadcast Interrogation Message to Mode S addresses known to the own aircraft; generating, if the different MID Subfield is not unique among the known Mode S addresses, a new address for use in said utilizing step, the new address being different from the Mode S address of the own aircraft; continuing, after said utilizing step begins to utilize the different MID Subfield for the TCAS Broadcast Interrogation Message, to determine whether at least two other TCAS-equipped aircraft are within three nautical miles of the own aircraft; and reverting to the own aircraft Mode S address for the MID Subfield of the TCAS Broadcast Interrogation Message when said continuing step determines that at least two other TCAS-equipped aircraft are not within three nautical miles of the own aircraft.

15. A Traffic Alert and Collision Avoidance System according to claim 9, wherein the different MID Subfield is randomly generated.

16. A Traffic Alert and Collision Avoidance System according to claim 9, wherein the different MID Subfield is generated by adding an offset to the own aircraft Mode S address.

17. A Traffic Alert and Collision Avoidance System (TCAS), comprising:

a digital circuit that performs a method comprising the step of utilizing an MID Subfield for a TCAS Broadcast Interrogation Message that is different than a Mode S address assigned to own aircraft, the aircraft on which a TCAS is installed.

18. Computer executable code for implementing a method of a Traffic Alert and Collision Avoidance System (TCAS), said code for executing the step comprising:

utilizing an MID Subfield for a TCAS Broadcast Interrogation Message that is different than a Mode S address assigned to own aircraft, the aircraft on which a TCAS is installed.

19. Computer executable code for implementing a method of a Traffic Alert and Collision Avoidance System according to claim 18, said method further comprising the step of:

determining whether another TCAS-equipped aircraft is near the own aircraft, wherein said utilizing step is performed only if said determining step determines that another TCAS-equipped aircraft is near the own aircraft.

20. Computer executable code for implementing a method of a Traffic Alert and Collision Avoidance System according to claim 18, said method further comprising the step of:

determining whether at least two other TCAS-equipped aircraft are within three nautical miles of the own aircraft, wherein said utilizing step is performed only if said determining step determines that at least two other TCAS-equipped aircraft are within three nautical miles of the own aircraft.

21. Computer executable code for implementing a method of a Traffic Alert and Collision Avoidance System according to claim 20, said method further comprising the steps of:

continuing, after said utilizing step begins to utilize the different MID Subfield for the TCAS Broadcast Interrogation Message, to determine whether at least two other TCAS-equipped aircraft are within three nautical miles of the own aircraft; and reverting to the own aircraft Mode S address for the MID Subfield of the TCAS Broadcast Interrogation Message when said continuing step determines that at least two other TCAS-equipped aircraft are not within three nautical miles of the own aircraft.

22. Computer executable code for implementing a method of a Traffic Alert and Collision Avoidance System according to claim 18, said method further comprising the step of:

comparing the different MID Subfield of the TCAS Broadcast Interrogation Message to Mode S addresses known to the own aircraft, wherein if the different MID Subfield is not unique among the known Mode S addresses, then a new address is generated and utilized in said utilizing step, the new address being different from the Mode S address of the own aircraft.

23. Computer executable code for implementing a method of a Traffic Alert and Collision Avoidance System according to claim 18, said method further comprising the steps of:

determining whether at least two other TCAS-equipped aircraft are within three nautical miles of the own aircraft, said utilizing step being performed only if said determining step determines that at least two other TCAS-equipped aircraft are within three nautical miles of the own aircraft;

comparing the different MID Subfield of the TCAS Broadcast Interrogation Message to Mode S addresses known to the own aircraft;

generating, if the different MID Subfield is not unique among the known Mode S addresses, a new address for use in said utilizing step, the new address being different from the Mode S address of the own aircraft;

continuing, after said utilizing step begins to utilize the different MID Subfield for the TCAS Broadcast Interrogation Message, to determine whether at least two other TCAS-equipped aircraft are within three nautical miles of the own aircraft; and reverting to the own aircraft Mode S address for the MID Subfield of the TCAS Broadcast Interrogation Message when said continuing step determines that at least two other TCAS-equipped aircraft are not within three nautical miles of the own aircraft.

24. Computer executable code for implementing a method of a Traffic Alert and Collision Avoidance System according to claim 18, wherein the different MID Subfield is randomly generated.

25. Computer executable code for implementing a method of a Traffic Alert and Collision Avoidance System according to claim 18, wherein the different MID Subfield is generated by adding an offset to the own aircraft Mode S address.

26. Computer executable code for implementing a method of a Traffic Alert and Collision Avoidance System according to claim 18, wherein a readable medium is provided for storing the computer executable code.

* * * * *